US009047721B1

(12) United States Patent
Botnen

(10) Patent No.: US 9,047,721 B1
(45) Date of Patent: Jun. 2, 2015

(54) DRIVER LOG GENERATION

(71) Applicant: Lytx, Inc., San Diego, CA (US)

(72) Inventor: Joshua Donald Botnen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/070,206

(22) Filed: Nov. 1, 2013

Related U.S. Application Data

(63) Continuation of application No. 13/222,301, filed on Aug. 31, 2011, now Pat. No. 8,606,492.

(51) Int. Cl.
*G06F 19/00* (2011.01)
*G07C 5/02* (2006.01)

(52) U.S. Cl.
CPC ........................................ *G07C 5/02* (2013.01)

(58) Field of Classification Search
CPC ............ G07C 5/00; G06F 17/00; G06F 17/40
USPC ........................................................ 701/123
See application file for complete search history.

(56) References Cited

U.S. PATENT DOCUMENTS 8,140,358 B1 * 3/2012 Ling et al. ......................... 705/4
2006/0180647 A1 * 8/2006 Hansen ......................... 235/375
2014/0025225 A1 * 1/2014 Armitage et al. ................ 701/1

* cited by examiner

*Primary Examiner* — James Trammell
*Assistant Examiner* — Michael D Lang
(74) *Attorney, Agent, or Firm* — Van Pelt, Yi & James LLP

(57) ABSTRACT

A system for determining a driver log entry comprises a processor and a memory. The processor is configured to determine a log start time. The processor is configured to determine a driver identity after the log start time. The processor is configured to determine whether a change to the driver identity has occurred based at least in part on a sensor data. In the event that the driver identity has changed, the processor is configured to determine a log stop time and determine a driver log entry using the log start time, the driver identity, and the log stop time.

20 Claims, 8 Drawing Sheets

DRIVER LOG GENERATION

CROSS REFERENCE TO OTHER APPLICATIONS

This application is a continuation of co-pending U.S. patent application Ser. No. 13/222,301, entitled DRIVER LOG GENERATION filed Aug. 31, 2011 which is incorporated herein by reference for all purposes.

BACKGROUND OF THE INVENTION

An accurate and up-to-date driver's log is needed for appropriate driver performance assessment and for complying with the hours-of-service (HOS) rule of the Federal Motor Carrier Safety Administration (FMCSA). In addition to regular driver's log audits, the Commercial Vehicle Safety Alliance (CVSA) conducts frequent roadside inspections of commercial motor vehicles and requires drivers to produce current and accurate driver logs. However, it is difficult to maintain accurate and up-to-date driver's logs. One problem is that driver logs are prone to human errors as they are typically manually maintained by drivers. And, another problem is that driver logs are not up-to-date as they are time consuming to maintain.

BRIEF DESCRIPTION OF THE DRAWINGS

Various embodiments of the invention are disclosed in the following detailed description and the accompanying drawings.

DETAILED DESCRIPTION

Figure 1:
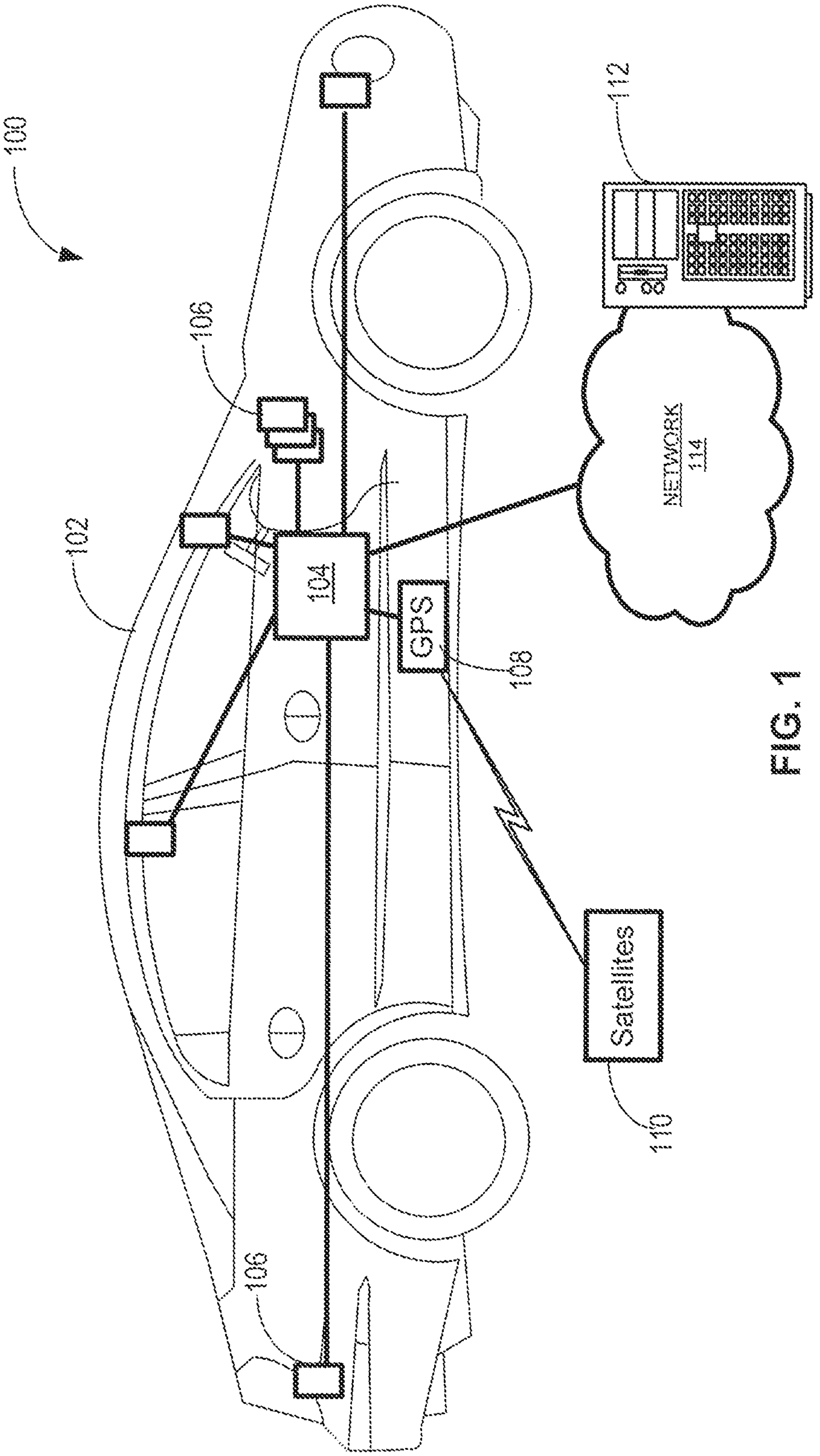
FIG. 1 is a block diagram illustrating an embodiment of a system for determining a driver log entry.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a driver log entry is disclosed. The system comprises a processor and a memory. The processor is configured to determine a log start time. The processor is configured to determine a driver identity after the log start time. The processor is configured to determine whether a change to the driver identity has occurred based at least in part on a sensor data. In the event that the driver identity has changed, the processor is configured to determine a log stop time and determine a driver log entry using the log start time, the driver identity, and the log stop time.

In some embodiments, a driver log system determines a driver log entry including the start and stop times and start and stop dates and a driver identity between the start and stop times and between the start and stop dates. The system automatically detects a change of driver identity and appropriately associates the identified driver with the driving data for the period of the identified driver. For example, the system identifies the start of a driver, identifies the driver, and identifies the end of the driver and associates the driving data for the driver with the identified driver. In various embodiments, the driving data comprises a trip start time, a trip end time, a trip route, and a trip duration, or any other appropriate driving data. In various embodiments, the driving data comprises a drive event (e.g., an accident), a drive performance assessment, a safety performance, a fuel efficiency performance, a rule or a policy compliance performance, or any other appropriate driving data. In some embodiments, a log start time for a log entry comprises a log start time of day and a start date and a log stop time of day and a stop date. In various embodiments, the sensor data comprises a measurement of one or more of the following: an ignition on state, an ignition off state, a power on state, a power off state, an engine on state, an engine off state, and a detected driver weight state. In various embodiments, the driver identity is based at least in part on one or more of the following: a drive maneuver signature, a biometric identifier (e.g., a fingerprint identifier, a facial feature identifier, a retina identifier, and a voice identifier), a badge, a radio frequency identifier badge, or any other appropriate way of identifying a driver.

FIG. 1 is a block diagram illustrating an embodiment of a system for determining a driver log entry. In the example shown, vehicle 102 is equipped with onboard computer 104 that interfaces with onboard sensors 106. Onboard computer 104 includes one or more processors that are capable of executing computer instructions for carrying out various functions involved in determining a driver log entry. Onboard computer 104 further includes one or more data storage units for storing computer instructions, rules, algorithms, driving data, various databases and maps such as digital safety map. Onboard computer 104 further includes one or more communication interfaces for communicating with onboard sensors 106 (including GPS receiver 108) and remote server 112 sitting on network 114. The communication interfaces can include interfaces for wired and/or wireless (short range or long range) links, direct and/or indirect communication links. Example include interfaces for USB cable, vehicle bus (e.g., on board diagnostics (OBD)), global positioning system (GPS), Bluetooth™, ZigBee™ link, IEEE 802.11 point-to-point link, and wire/wireless data network link. Network 114 can include wired or wireless network such as wired or wireless phone network, local area network (LAN), and wide area network (WAN).

In various embodiments, onboard sensors 106 include at least an image capturing device (e.g., video camera and still camera), GPS receiver 108 for receiving geo-location data, and a sensor for detecting vehicle operation state. In some embodiments, GPS receiver 108 is configured to receive geo-location data from one or more satellites 110. In some embodiments, some of onboard sensors 106 (e.g., GPS receiver, accelerometer) are incorporated into the onboard computer. In some embodiments, onboard sensors 106 are separate from onboard computer 104. Onboard sensors 106 can be configured to detect various driving data during vehicle operation, including driver behavior, vehicle operation state, and/or various driving conditions or environmental parameters. The driving conditions may include road conditions, weather conditions, and/or traffic conditions. In various embodiments, circuitries, processors and/or communications interfaces can be included in one or more sensors for carrying out various functions such as capturing, storing, processing, and/or transmitting sensor data. For example, a sensor on/off circuitry may be included to turn on/off the sensor, a data capture circuitry may be included to capture sensor data, and a communications interface circuitry may be included to transmit sensor data to a remote server. These sensor functions may be performed automatically by the sensor or carried out in response to external commands issued for example by the onboard computer 104. In various embodiments, one or more data storage units (not shown) are included in or associated with one or more sensors for storing computer instructions and sensor data. The data storage units may include internal or external, fixed or removable, persistent and/or volatile memory. Onboard computer 104 is configured to receive sensor data from one or more onboard sensors and receive other information from other external source(s) (e.g., satellite GPS location data, weather information, and/or road map) via the various communications interfaces. For example, still or moving images from various viewing perspectives; speed, acceleration and direction of the vehicle; the geo-location of the vehicle, and environmental temperature and moisture level are received from various onboard sensors. The received sensor data are analyzed to determine driver identity by associating data with driving maneuvers. The data from different sensors may be correlated to time and geo-location of the moving vehicle.

In various embodiments, onboard computer 104 may be configured to perform analyses of the detected driving data. Since the computation capacity of the onboard computing device may be limited, such analyses may be preliminary analyses and less robust or complex than those that can be performed on a remote server that has more computation power. In various embodiments, onboard computer 104 may be configured to upload the driving data (e.g., sensor data and/or analysis data) to remote server 112 for further analysis, processing, and/or storage. Uploading can be carried automatically by onboard computer 104 based on predefined criteria or upon requests by for example remote server 112. Remote server 112 may perform more detailed and/or additional analysis of the driving data. For example, the server may use the driving data to determining a driver log entry or to determine a driver identity from driving maneuver data, analyze driving data, determine driver performance, such as determine driver attitude (e.g., recklessness) and skill, calculate driver risk score, generate driver profile, identifying dangerous and erratic driving behavior, identifying driver deviation from his/her normal driving behavior (by comparing with his/her drive profile), etc., identifying high risk driver, perform risk analysis for a group of drivers or for an entire fleet, calculating insurance, and/or generate various reports.

Figure 2:
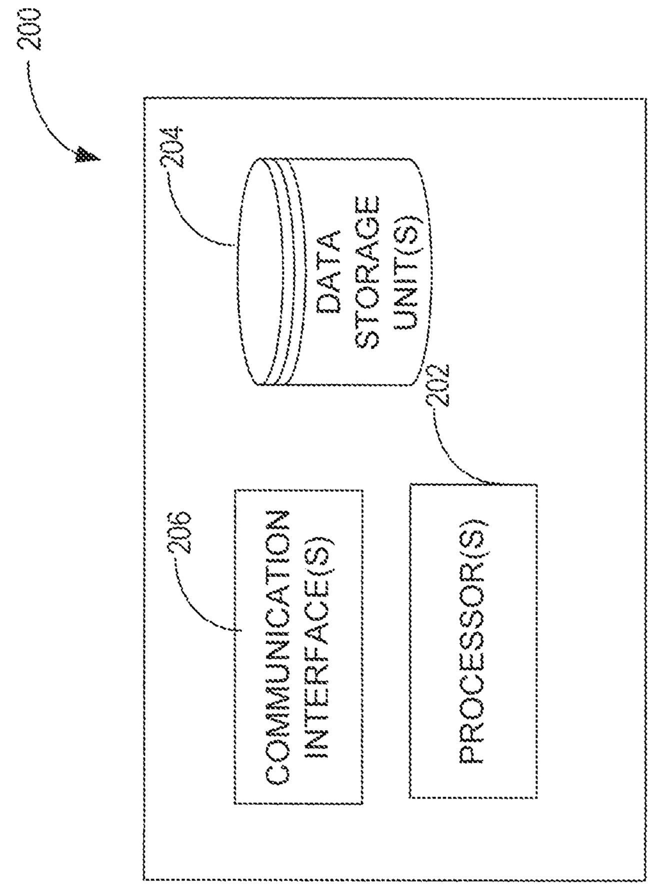
FIG. 2 is a block diagram illustrating an embodiment of an onboard computer.

FIG. 2 is a block diagram illustrating an embodiment of an onboard computer. In some embodiments, onboard computer 200 of FIG. 2 comprises onboard computer 104 of FIG. 1. In the example shown, onboard computer 200 includes one or more processors that are capable of executing computer instructions for carrying out various functions involved in determining a driver log entry. Onboard computer 200 further includes one or more data storage units 204 for storing computer instructions, rules, algorithms, driving data, various databases and maps such as digital safety map. Onboard computer 200 further includes one or more communication interfaces 206 for communicating with onboard sensors and a network.

Figure 3:
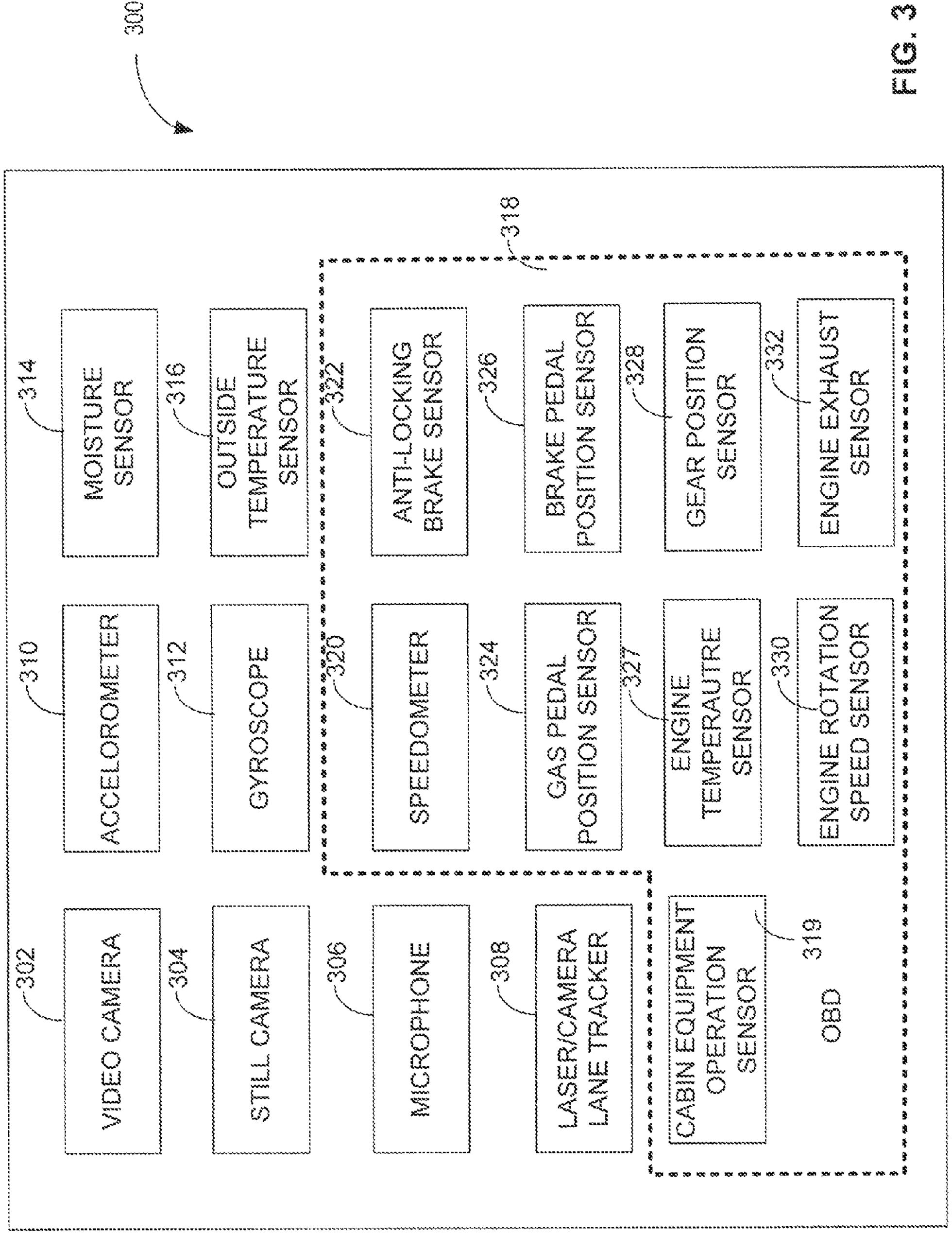
FIG. 3 is a block diagram illustrating an embodiment of onboard sensors.

FIG. 3 is a block diagram illustrating an embodiment of onboard sensors. In the example shown, one or more video cameras 302 and/or still cameras 304 are mounted at various positions on the vehicle to capture a cabin view or an exterior view—for example, a front view, a rear view, a left side view, and/or right side view. In some embodiments, video cameras 302 and/or still cameras 304 are equipped with infrared emitters for improved night vision and/or for imaging driver facial features through dark sun glasses. In some embodiments, video cameras 302 and/or the still cameras 304 comprise stereo video cameras and/or still cameras that are capable of capturing 3-D images. In some embodiments, the captured images are used to identify the driver, record driver behavior and circumstances leading up to, during, and immediately after a drive event. The captured images may be used to recognize road signs such as posted speed limit signs. In some embodiments, one or more microphones 306 are placed inside and/or outside the cabin to record audio sounds. In some embodiments, one or more laser and/or camera based lane tracking sensors 308 are positioned in the front and/or at the back of the vehicle to track drifting of the vehicle in lane. In some embodiments, video camera(s) 302 are mounted in the overhead console above the mirror to track the lane markings on the roadway. The captured video images may be processed using one or more processors to determine whether the vehicle has departed from its proper lane and by how much. In some embodiments, one or more accelerometers 310 are placed onboard the vehicle to monitor acceleration along one or more vehicle axes. The axes of vehicle acceleration may include a longitudinal vehicle axis—the axis substantially in the direction of the vehicle's principal motion, a traverse (lateral) vehicle axis—the substantially horizontal axis substantially orthogonal to the vehicle's principle motion, and a vertical vehicle axis—the axis orthogonal to both the longitudinal vehicle axis and the traverse vehicle axis. In various embodiments, accelerometers 310 comprise built-in accelerometers put in place by the vehicle manufacture or are add-on accelerometers added on post manufacture. In some embodiments, gyroscope 312 is placed on board the vehicle to detect angular rate of vehicle rotation and how quickly the vehicle turns. The rotation is typically measured in reference to one of three axes: yaw, pitch and roll. In some embodiments, moisture sensor 314 is mounted on the outside of the vehicle to detect environmental moisture level, which provides an indication whether it is raining on the road. In some embodiments, temperature sensor 316 is mounted on the outside of the vehicle to detect environmental temperature, which provides information as to how cold the outside environment is and whether it is below freezing and by how much. In addition, the onboard computer has the capability to access information detected by one or more vehicle sensors built in the vehicle by the manufacture via a vehicle bus interface such as an OBD interface 318. For example, via OBD interface 318, the onboard computer can access cabin equipment operation sensor 319, manufacturer built-in speedometer 320 for detecting vehicle speed, anti-lock brake system speed sensor 322 for detecting the rate at which the vehicle wheels are moving and whether the anti-locking brake has been engaged, gas pedal position sensor 324 and brake pedal position sensor 326 for detecting the gas pedal and brake pedal depression degrees and profiles, engine temperature sensor 327 for sensing engine temperature, gear position sensor 328 for sensing gear position/selection, engine rotation speed sensor 330 for sensing the engine rotation speed, and engine exhaust sensor 332 for sensing composition and temperature of engine exhaust. The onboard vehicle sensors are not limited by the examples provided here. In various embodiments, other vehicle sensors are included—for example, shock sensor, various cabin equipment operation sensors regarding operation of windshield wipers, state of lights (e.g., on, off, fog lights, blights, etc.), operation of equipment within the vehicle such as radios, cellular phones, DVD players, the identity of the driver based on the entry of an identification number, seat settings, weight, status of seat belts, number of passengers, or any other appropriate sensors.

Figure 4:
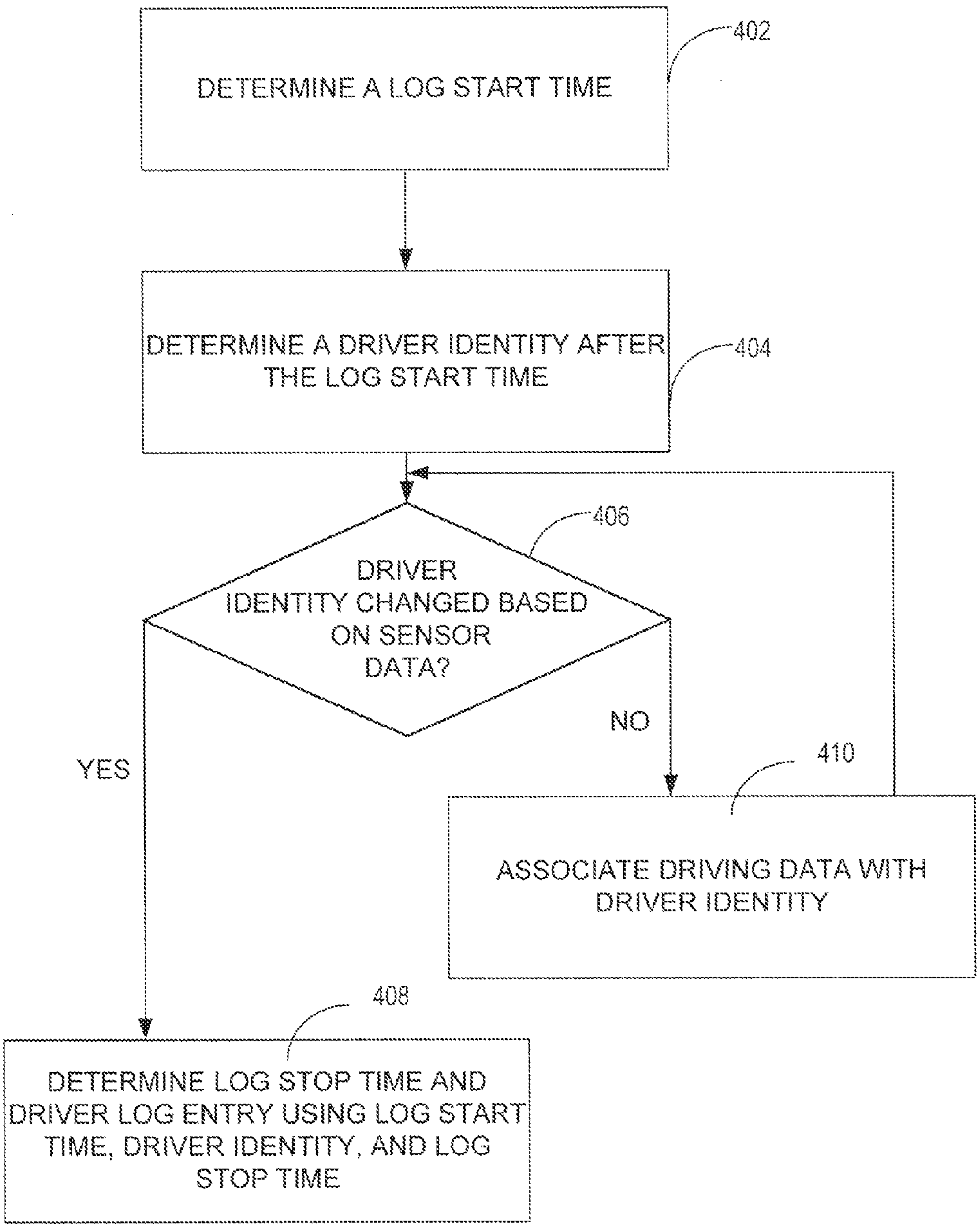
FIG. 4 is a flow diagram illustrating an embodiment of a process for determining a driver log entry.

FIG. 4 is a flow diagram illustrating an embodiment of a process for determining a driver log entry. In the example shown, in 402 a log entry start time is determined. For example, a trip start or a driver session start time of day and date are designated as a log entry start time. In 404, a driver identity is determined after the log entry start time. For example, driver identity is determined using a badge, a camera that takes and image which is analyzed using face recognition software, a fingerprint, a drive maneuver (e.g., a recognized manner of driving a particular maneuver as measured using sensors in a vehicle), a voice signature, a retina scan, or any other appropriate determination of identity. In 406, it is determined whether a driver identity has changed based on sensor data. For example, a driver identity is determined as having changed in the event that a new face appears in a cabin camera image, a new identification badge is recognized, a different driving manner is detected, a different weight in the seat is measured, or any other appropriate manner of identifying a change in driver. In 408, in the event that a change in driver identity has been determined based on sensor data, a log entry stop time is determined and a drive log entry is determined using the log start time, the driver identity, and the log stop time. In 410, in the event that there has been no change in driver identity based on sensor data, driving data is associated with the driver identity. For example, driving events and other driving data is stored as being associated with the driver identity.

In some embodiments, a driving log entry is generated by determining a time period during which no driver change event is detected for a moving vehicle is identified. For example, driver change events are detected if one or more of the following is detected: ignition on, ignition off, engine on, engine off, detected weight placed on the driver seat meets one or more predefined criteria that indicate a different driver is operating the vehicle, shift in park, a different driver has swiped his/her card or otherwise checked in, or any other appropriate driver change event.

In some embodiments, a driver is identified using a facial image of the driver that is captured using an image capturing device such as a video camera or still camera. In some embodiments, the driver is identified manually by human operator. In various embodiments, various biometrics of the driver are obtained using various onboard sensors and used to identify the driver—for example, driver facial features (or face data), retina characteristics, voice characteristics and finger prints, etc. In some embodiments, a drive maneuver signature identifies the driver. For example, a driver has measurable characteristic behaviors as the driver performs the drive maneuver which can be analyzed to identify the driver. In various embodiments, the drive maneuver used to identify a driver comprises a right/left turn maneuver, a highway on/off ramp maneuver, a U-turn maneuver, a lane change maneuver, a vehicle launching from stop maneuver, a vehicle stop from moving maneuver, or any other appropriate maneuver. In some embodiments, a specific maneuver at a specific geolocation is used to identify a driver from a plurality of drivers. For example, a driving behavior or characteristic along a tricky stretch of road, negotiating a turn leaving the shipping yard, etc. The driving behavior or characteristics are captured by storing the data from one or more onboard sensors of the vehicle. In various embodiments, the driver is identified using a badge or by driver self-identified, or any other appropriate identification manner.

In some embodiments, a driver is assigned as the sole driver of the vehicle during a period after the start of driving and up until a change in the driver is detected or input. In various embodiments, the driving data comprise a trip start time, a trip end time, a trip route, a trip duration, miles driven, a vehicle control operation, a vehicle operation status, a driver behavior, a driving environment condition (e.g., a road condition, a weather condition, and a traffic condition), a drive events, a driver performance assessment, or any other appropriate driving data.

Figure 5:
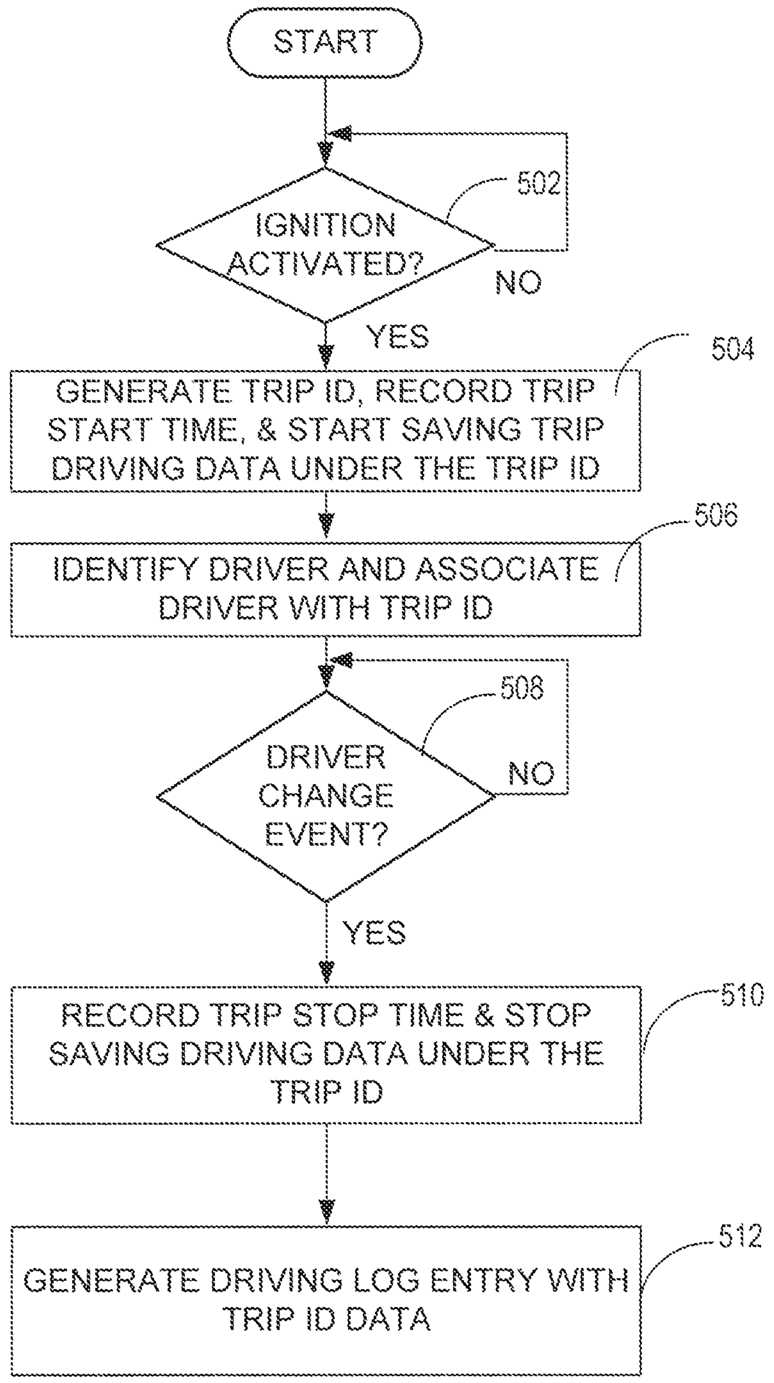
FIG. 5 is a flow diagram illustrating an embodiment of a process for generating a driving log entry.

FIG. 5 is a flow diagram illustrating an embodiment of a process for generating a driving log entry. In the example shown, in 502, it is determined whether the ignition is activated. In the event that the ignition is not activated, control passes to 502. In the event that the ignition is activated control passes to 504. In 504, a trip ID is generated, a trip start time is recorded, and saving trip driving data is started under the trip ID. In 506, the driver is identified and the driver is associated with the trip ID. In 508, it is determined whether a driver change event occurred. In the event that a driver change event has not occurred, control passes to 508. In the event that a driver change event has occurred, control passes to 510. In 510, a trip stop time is recorded and saving trop driving data is stopped under the trip ID. In 512, a driver log entry is generated based in the trip ID data.

In some embodiments, one or more sensors are recorded continuously and associated with a trip identifier (ID). In some embodiments, the recorded data are saved to a nonvolatile memory or transferred to remote server only in the event that a driving event has occurred (e.g., an accident, a near accident, etc.). In some embodiments, a drive event or potential drive event is detected in the event that one or more sensor data meet a predefined criterion such as exceeding a predefined threshold level or matching a predefined profile.

Figure 6:
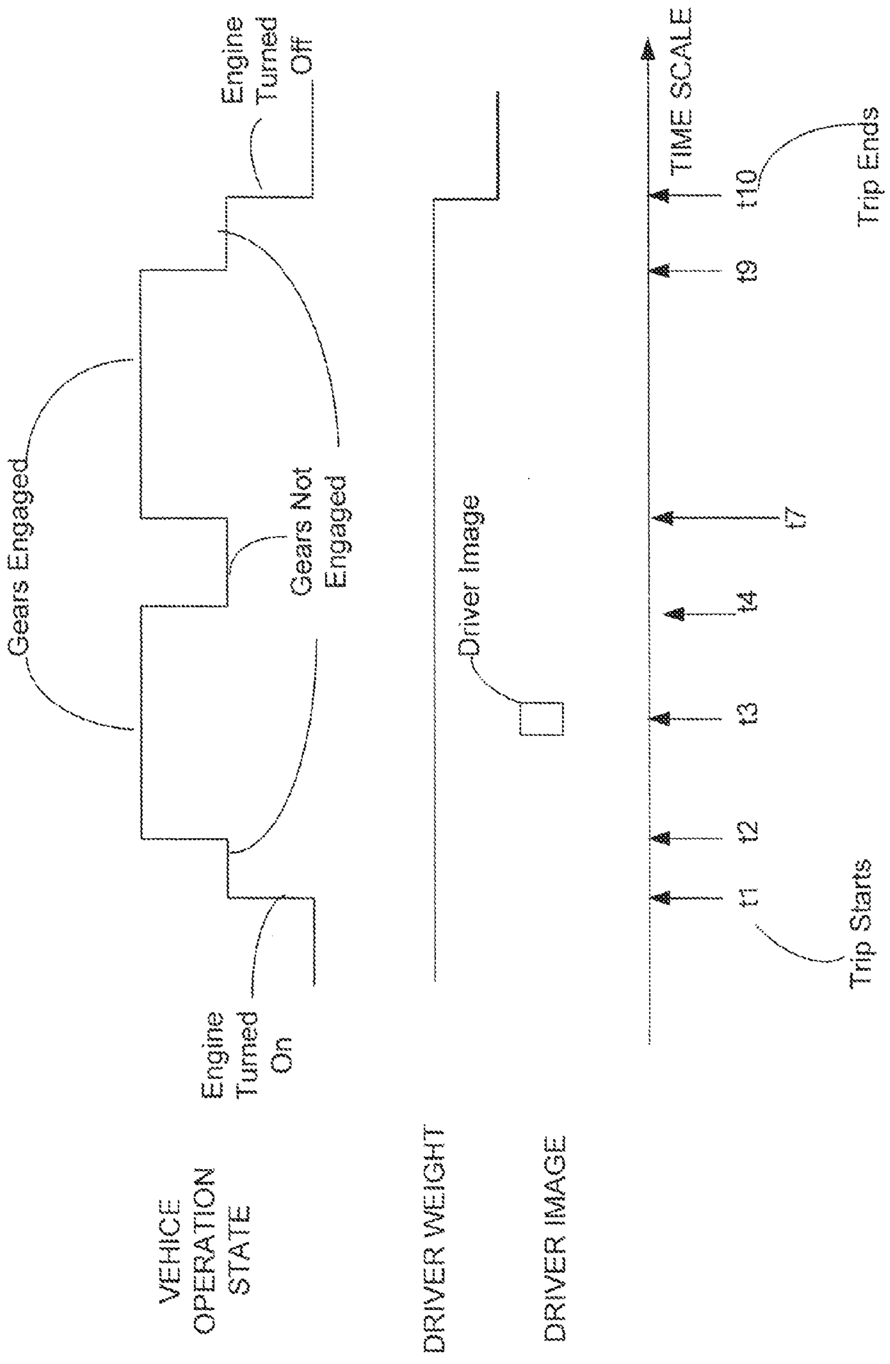
FIG. 6 is a diagram illustrating an embodiment of driving data.

FIG. 6 is a diagram illustrating an embodiment of driving data. In some embodiments, an interface to a vehicle onboard diagnostic bus (ODB) is used to access the operation state of the vehicle and the detected driver weight. An image capturing device is used to capture driver facial images used by a face recognition algorithm to identify the driver. In the example shown, a trip starts at t1 when the engine is turned on and ends at t11 when the engine is turned off. From t1 to t2, the gears are not engaged (e.g., the vehicle is stopped). From t2 to t4, the gears are engaged (e.g., the vehicle is moving). At t3, a driver image is captured. The driver image is used to identify the driver. From t4 to t7, the gears are not engaged and the driver weight is the same (e.g., the weight as detected by a seat sensor measures the same amount). In this case, no driver change event is indicated as the driving weight did not change when the gears are not engaged. From t7 to t9, the gears are engaged. Note no image is captured in the time period t7 to t9, however as there has been no driver change detected, the driver identified previously is still considered to be the driver. At t10, the engine is turned off and the driver weight changes. This is considered a driver change event. The trip is ended. The trip ID is changed. The driver is no longer considered to be known.

Figure 7:
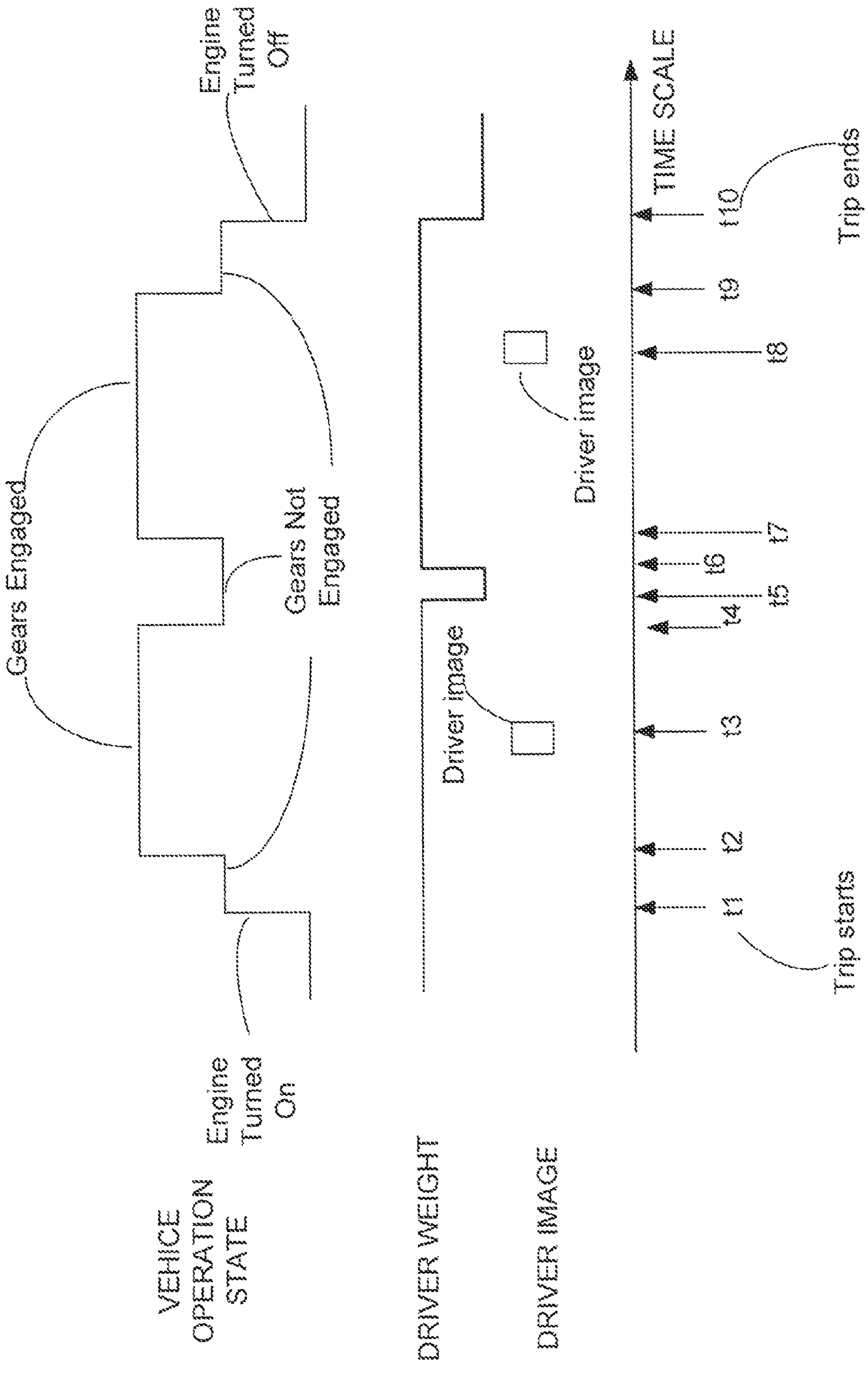
FIG. 7 is a diagram illustrating an embodiment of driving data.

FIG. 7 is a diagram illustrating an embodiment of driving data. In some embodiments, an interface to a vehicle onboard diagnostic bus (ODB) is used to access the operation state of the vehicle and the detected driver weight. An image capturing device is used to capture driver facial images used by a face recognition algorithm to identify the driver. In the example shown, a trip starts at t1 when the engine is turned on and ends at t11 when the engine is turned off. From t1 to t2, the gears are not engaged (e.g., the vehicle is stopped). From t2 to t4, the gears are engaged (e.g., the vehicle is moving). At t3, a driver image is captured. The driver image is used to identify the driver. From t4 to t8, the gears are not engaged. However, from t5 to t6, the driver weight is different. From t6 to t10, the driver weight returns to the same value as t1 to t5. This indicates that the driver is likely the same (e.g., has the same weight as detected using an onboard sensor—for example a seat weight sensor). As the driver weight is the same when the gears are again engaged, no driver change event is indicated as the driving weight did not change when the gears are not engaged. From t7 to t9, the gears are engaged. At t8, an image is captured. In this case it can be assumed that the driver is identical because of the weight sensor data being the same, however, the driver image can be used to confirm the lack of change of driver identity. At t10, the engine is turned off and the driver weight changes. This is considered a driver change event. The trip is ended. The trip ID is changed. The driver is no longer considered to be known.

Figure 8:
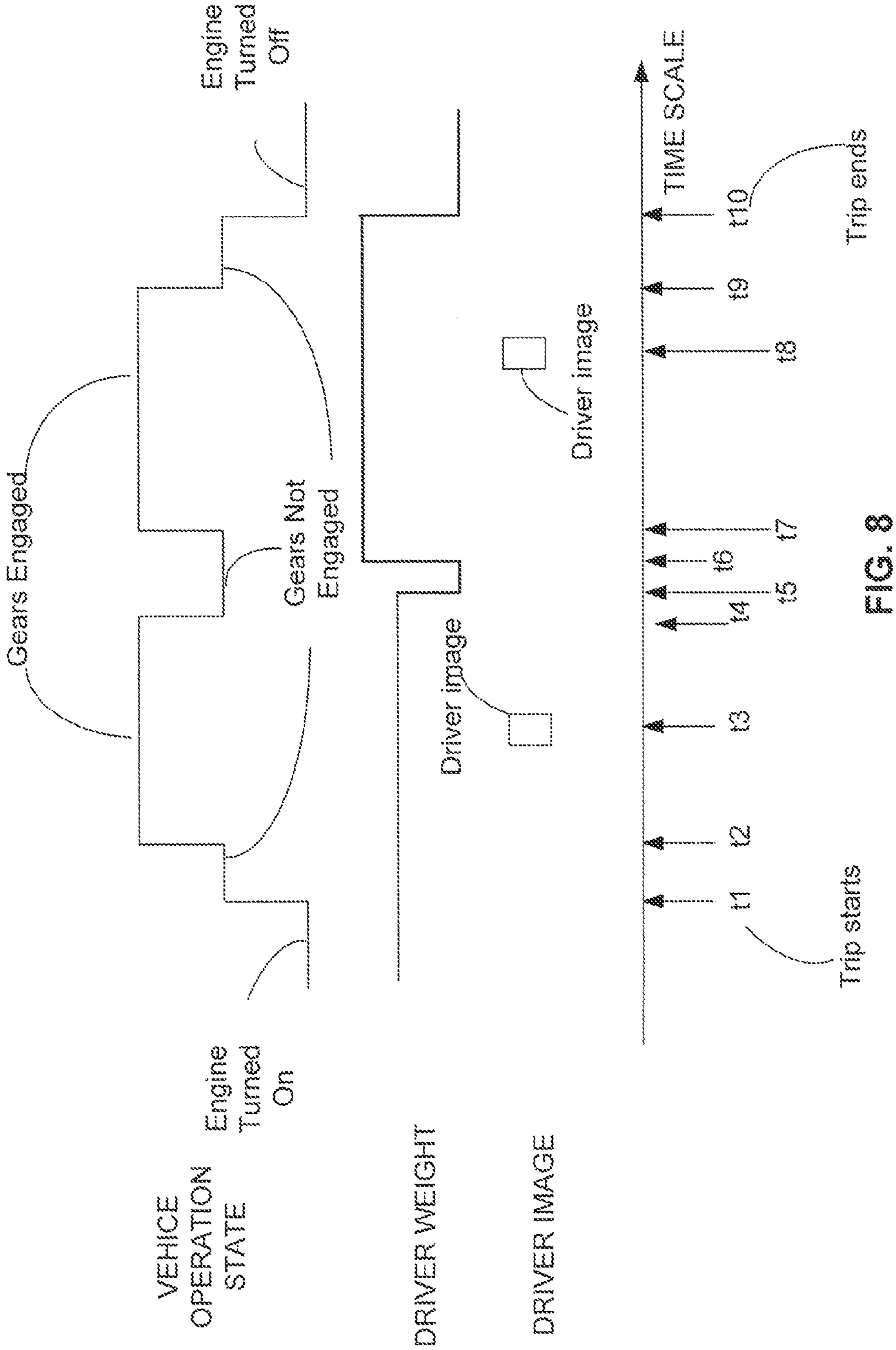
FIG. 8 is a diagram illustrating an embodiment of driving data.

FIG. 8 is a diagram illustrating an embodiment of driving data. In some embodiments, an interface to a vehicle onboard diagnostic bus (ODB) is used to access the operation state of the vehicle and the detected driver weight. An image capturing device is used to capture driver facial images used by a face recognition algorithm to identify the driver. In the example shown, a trip starts at t1 when the engine is turned on and ends at t11 when the engine is turned off. From t1 to t2, the gears are not engaged (e.g., the vehicle is stopped). From t2 to t4, the gears are engaged (e.g., the vehicle is moving). At t3, a driver image is captured. The driver image is used to identify the driver. From t4 to t8, the gears are not engaged. However, from t5 to t6, the driver weight is different. From t6 to t10, the driver weight is a higher value compared to t1 to t5. This indicates that the driver is likely not the same (e.g., has a different weight as detected using an onboard sensor—for example a seat weight sensor). As the driver weight is not the same when the gears are again engaged, a driver change event is indicated as the driving weight did change when the gears are not engaged. From t7 to t9, the gears are engaged. At t8, an image is captured. In this case, it can be assumed that the driver is different because of the weight sensor data being different, and, the driver image can be used to identify the new driver. At t10, the engine is turned off and the driver weight changes. This is also considered a driver change event. The trip is ended. The trip ID is changed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a driver log entry, comprising:
- an interface configured to receive a sensor data from a vehicle;
- a processor configured to:
  - determine automatically a driver identity after a log start time, comprising:
    - capture a first image of the driver;
  - determine automatically whether a change to the driver identity has occurred based at least in part on the sensor data, comprising:
    - determine whether gears of the vehicle have been disengaged and subsequently reengaged; and
    - in the event that the gears of the vehicle have been disengaged and subsequently reengaged:
      - determine whether the weight of the driver has decreased and subsequently increased between the disengaging and subsequent reengaging of the gears of the vehicle; and
      - in the event that the weight of the driver has decreased and subsequently increased between the disengaging and subsequent reengaging of the gears of the vehicle:
        - capture a second image of the driver;
        - compare the first and second images of the driver; and
        - in the event that the first and second images of the driver are different, determine that a change to the driver identity has occurred; and
  - in the event that the driver identity has changed,
    - determine an hour of service data based at least in part on the log start time; and
    - store a driver log entry using the driver identity and the hours of service data.

2. The system as in claim 1, wherein the driver identity is associated with an hour of service data based at least in part on the log start time and a log stop time.

3. The system as in claim 1, wherein a driving data associated with the driver identity comprises one or more of the following: a trip start time, a trip end time, a trip route, and a trip duration.

4. The system as in claim 1, wherein the driving data comprises a drive event.

5. The system as in claim 1, wherein the driving data comprises a drive performance assessment.

6. The system as in claim 1, wherein the driving data comprises a safety performance.

7. The system as in claim 1, wherein the driving data comprises a fuel efficiency performance.

8. The system as in claim 1, wherein the driving data comprises a rule or a policy compliance performance.

9. The system as in claim 1, wherein the log start time and the log stop time include a time of day and a date.

10. The system as in claim 1, wherein the sensor data comprises a measurement of one or more of the following: an ignition on state, an ignition off state, a power on state, a power off state, an engine on state, an engine off state, and a detected driver weight state.

11. The system as in claim 1, wherein determining the driver identity is based at least in part on a drive maneuver signature.

12. The system as in claim 1, wherein determining the driver identity is based at least in part on a biometric identifier.

13. The system as in claim 12, wherein the biometric identifier comprises one or more of the following: a fingerprint identifier, a facial feature identifier, a retina identifier, and a voice identifier.

14. The system as in claim 1, wherein determining the driver identity is based at least in part on an identification badge.

15. The system as in claim 14, wherein the identification badge includes a radio frequency identification badge.

16. The system as in claim 1, wherein in the event that the weight of the driver has not decreased and subsequently increased between the disengaging and subsequent reengaging of the gears of the vehicle, omit the capturing of the second image of the driver.

17. The system as in claim 1, wherein in the event that the first and second images of the driver are the same, determine that a change to the driver identity has not occurred.

18. The system as in claim 1, wherein in the event that the weight of the driver has decreased and subsequently increased between the disengaging and subsequent reengaging of the gears of the vehicle:

determine whether a weight of the driver before the weight of the driver decreased and a weight of the driver after the weight of the driver increased are different; and in the event that the weight of the driver before the weight of the driver decreased and the weight of the driver after the weight of the driver increased are different, determine that a change to the driver identity has occurred.

19. A method for determining a driver log entry, comprising:

receiving a sensor data from a vehicle;

determining automatically a driver identity after a log start time, comprising:

capturing a first image of the driver;

determining automatically using a processor whether a change to the driver identity has occurred based at least in part on the sensor data, comprising:

determining whether gears of the vehicle have been disengaged and subsequently reengaged; and in the event that the gears of the vehicle have been disengaged and subsequently reengaged:

determining whether the weight of the driver has decreased and subsequently increased between the disengaging and subsequent reengaging of the gears of the vehicle; and in the event that the weight of the driver has decreased and subsequently increased between the disengaging and subsequent reengaging of the gears of the vehicle:

capturing a second image of the driver;

comparing the first and second images of the driver; and in the event that the first and second images of the driver are different, determining that a change to the driver identity has occurred; and in the event that the driver identity has changed, determining an hour of service data based at least in part on the log start time; and storing a driver log entry using the driver identity and the hours of service data.

20. A computer program product for determining a driver log entry, the computer program product being embodied in a tangible computer readable storage medium and comprising computer instructions for:

receiving a sensor data from a vehicle;

determining automatically a driver identity after a log start time, comprising:

capturing a first image of the driver;

determining, automatically using a processor, whether a change to the driver identity has occurred based at least in part on the sensor data, comprising:

determining whether gears of the vehicle have been disengaged and subsequently reengaged; and in the event that the gears of the vehicle have been disengaged and subsequently reengaged:

determining whether the weight of the driver has decreased and subsequently increased between the disengaging and subsequent reengaging of the gears of the vehicle; and in the event that the weight of the driver has decreased and subsequently increased between the disengaging and subsequent reengaging of the gears of the vehicle:

capturing a second image of the driver;

comparing the first and second images of the driver; and in the event that the first and second images of the driver are different, determining that a change to the driver identity has occurred; and in the event that the driver identity has changed, determining an hour of service data based at least in part on the log start time; and storing a driver log entry using the driver identity and the hours of service data.

* * * * *